United States Patent [19]

Fukubayashi

[11] Patent Number: 5,044,855
[45] Date of Patent: Sep. 3, 1991

[54] THREAD-FORMING FASTENERS

[75] Inventor: Kenji Fukubayashi, Kyoto, Japan

[73] Assignee: Nitto Seiko Co., Ltd., Kyoto, Japan

[21] Appl. No.: 576,369

[22] Filed: Aug. 31, 1990

[51] Int. Cl.$^5$ .................. F16B 25/00; F16B 35/04
[52] U.S. Cl. .................. 411/386; 411/416; 411/426
[58] Field of Search ............ 411/386, 387, 416, 417, 411/418, 426

[56] References Cited

U.S. PATENT DOCUMENTS

| | | | |
|---|---|---|---|
| 2,484,644 | 10/1949 | Poupitch | 411/311 |
| 3,246,556 | 4/1966 | Phipard, Jr. | 411/416 |
| 3,446,262 | 5/1969 | Phipard, Jr. | 411/416 |
| 3,530,760 | 9/1970 | Lindstrand | 411/416 |
| 4,069,730 | 1/1978 | Gutshall | 411/386 |

FOREIGN PATENT DOCUMENTS 2501942  7/1976  Fed. Rep. of Germany ...... 411/416

Primary Examiner—Neill R. Wilson
Attorney, Agent, or Firm—Koda and Androlia

[57] ABSTRACT

This invention relates to an improvement of thread-forming fasteners comprising driving heads, shanks, work entering end portions without a thread and continuous rolled type threads on both the said shank and the said work entering end portions, the shanks being of arcuate triangular configuration in cross section which is characterized by three equally spaced lobes separated by relatively broad arcuate sides. The shanks are formed so that the radii of the lobes are gradually increased while the radii of the sides are gradually decreased toward the heads. And beside one of the threads in longitudinal section is of anti-symmetric triangular shape so that a slipping torque along the female thread formed thereby can be increased for easy entry in a workpiece in adding axial load during fastening operation and a slipping torque along the female thread can be decreased in axial loaded condition after it is seated on the workpiece. The above configuration of the fastener enables it to be easily driven into a thin workpiece with low driving torque on account of the less engagement between the screw thread and the female thread formed in the workpiece. And it enables it steadily secured to the workpiece with high stripping torque by the peripheral engagement between the screw thread and the female thread when it is seated.

1 Claim, 2 Drawing Sheets

FIG. 3
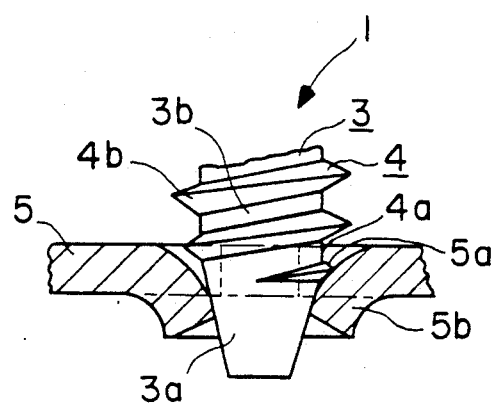
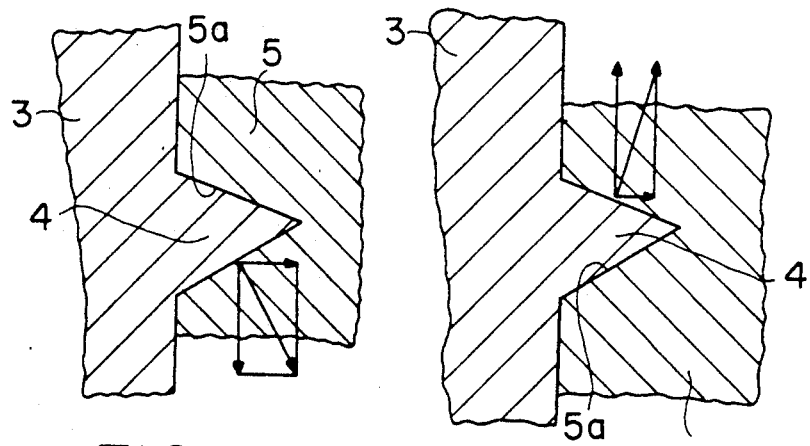
FIG. 4A
FIG. 4B

THREAD-FORMING FASTENERS

BACKGROUND OF THE INVENTION

1. Field of the Invention

This invention relates to an improvement of thread forming fasteners being easily driven into workpieces during the swaging operation and being steadily secured to them with high stripping torque when they are seated, preferably for thin boards and the like.

2. Prior Art

Generally selftapping fasteners or thread forming fasteners are advantageous for being driven into pilot holes drilled and untapped in thin boards and the like. Especially the thread forming fasteners form female threads in the side wall of the pilot hole in the boards by swaging operation. They are more advantageous for being difficult to loose by themselves because of tight engagement between the screw threads and the female threads when they are driven into the holes in the workpieces. And besides the female threads are advantageous for improving thier strength because of work hardening created in themselves. The thread forming fasteners, however have disadvantages for being driven through the workpieces with relatively high torque requirement. To prevent the disadvantages as above discribed, new screws have been developed, which was my Japanese Utility Model application No. 57-36820. The new screw has a driving head at one end with any driving means with which a driver bit may have engagement, and a shank portion with a straight thread formation at the other side. The shank portion is of non-circular or trilobular which may be termed an arcuate equilateral triangular shape in cross section of the blank. And the configuration is characterized by three equally spaced lobes, which are separated by relatively broad arcuate sides. The shank portion consists of the first portion which has a tapered end portion with a screw thread increasing gradually and progressly radial dimensions of the lobes and radial dimension of the broad arcuate sides between two adjacent lobes from the screw axis, the second portion which merges smoothly and continuously with the first portion and has a constant radial dimension from the screw axis to the lobes and has such lobes that have gradually increasing radii and such sides that have gradually decreasing radii, the third portion which merges smoothly and continuously with the second portion and is of a substantially circular shape in its cross section, and a screw thread formed over the first portion, the second portion and third portion.

When a screw is driven into a pilot hole in a workpiece, the first portion can curle a portion around the hole of the workpiece and a female thread is gradually swaged in the curled portion by the first tapered thread portion while the screw thread gradually increases an area of the sides in one revolution of the screw thread engaged with the female thread formed thereby. At this time it will be observed that the total engagement is decreased to amount to some of the total peripheral extent of one turn of the screw thread in the first portion because of the equilateral triangle of the first portion. Therefore the screw can be driven with very low driving torque. The second portion is driven into the pilot hole following the first portion and each lobe of the screw thread over the second portion gradually and progressly swages and enlarges the female thread formed by the first portion in order to complete a swaging operation. At this stage the engagement of the sides with the female thread is gradually increased and therefore a driving torque is increased little by little without introducing surged driving torque, because the configuration of the thread portion is gradually formed and converted from a triangular shape to a round shape. At the last stage the third portion of a substantially round shape in its cross section is driven there following the second portion, wherein the screw thread over it is in tight engagement with the female thread in the curled portion of the workpiece. And besides the cross sectional shape of a substantial circular in the third portion enables the total engagement of the screw thread with the female thread to amount to all the peripheral extent of one turn of the screw thread and to provide high stripping torque of the mating threads as well as the high fail torque after fastening operation.

Although the above discribed screw, has the tapered portion of the first portion for easy entry to a pilot hole punched or pierced in a workpiece, the screw thread over the tapered portion causes the pilot hole much larger in diameter than that of the end of the tapered portion. Therefore, the difference between the root radius of the screw thread over the second portion and the radius of the pilot hole decreases so as to shorten the curled portion along the hole in the workpiece. This causes the screw to have less holding strength. And also there will be introduced disadvantages that some parts of the screw thread over the tapered portion are cracked and the screw is difficult to begin a swage operation because the screw thread enlarges a pilot hole and forms a curled portion around the hole in the workpiece.

SUMMARY OF THE INVENTION

It is a primary object of the present invention to provide a new and improved thread forming fastener which is suitable for easy entry to a pilot hole in a workpiece and have higher holding torque in the loaded condition.

A further object of the invention is to provide a thread forming fastener with a tapered portion of three equilateral triangular shape or the similar shape in cross section without any screw thread at the end of the shank portion for faciliating a pilot hole punched or pierced in smaller diameter in a workpiece so that the curled portion by the tapered portion can be enlarged.

A still further object of the invention is to provide a thread forming fastener with a shank portion having the screw thread which is of anti-symmetric triangular shape in longitudinal section having crest angle of relatively larger leading flank angle and relatively smaller following flank angle for increasing a slipping force toward the direction along the female thread in the workpiece created by the axial load operation so that it can be easily driven with a low driving torque and decreasing a slipping force toward the opposite direction along the female thread created in the axially loaded condition so that it can be difficult to loose assemblies result and it can accordingly increase a holding torque of the screws.

In keeping with the principle of the present invention, the objects of this invention are acomplished by a unique thread formation for a thread forming fastener comprising a driving head with a recess which a driving bit is engaged with and a shank portion with a thread formation. The shank portion consists of a first portion of a poligonal pyramid which is of an arcuate triangular lobular configuration in cross section and is having increasing radii of arcuate lobes and increasing dimensions from a top of the lobes to the screw axis toward the driving head, a second portion which merges with the first portion and has a constant dimension from the top of the lobes to the screw axis and arcuate lobes having an increasing radii of the lobes and decreasing radii of the broard sides, a third portion which is of a substantially circular shape. Over the first portion, the second portion and the third portion a screw thread is formed which has triangular shapes of the screw thread in longitudinal section having a crest angle of a larger leading flank angle and a smaller following flank angle. The screw thread is merged at a joint portion between the first portion and the second portion and spiraled toward the driving head. The third portion, further may have serated portions in a flat portion between two adjacent screw threads. Furthermore the workpiece can be used which has a pilot hole a little larger in diameter than the second portion.

By means of the unique thread formation, the screw can be introduced into a pilot hole in a workpiece without fail because of no screw thread on a first portion even if it is punched or pierced rather smaller. When the screw is driven with driving torque, the first portion of poligonal pyramid can enlarge the hole without any damage of the screw thread and form a curled portion around it. In the curled portion the screw thread over the second portion can wedge and swage a female thread and then accordingly enlarge the hole as well as the female thread. At the beginning of this stage, an engagement of a flat portion between two adjacent screw threads is decreased and limited to an area around the lobes because the hole is punched or pirced as small as possible. Therefore the female thread can be swaged with low driving torque. And also the engagement of the screw thread with the female thread can be increased accordingly because a configuration of the second portion in cross section is changed and formed from an equilaterally poligonal lobular shape to a circular shape. Besides a divided force of a axial force added during fastening operation to the leading flank surface is increased because a leading flank angle is formed larger than a following flank angle is. Therefore these operations help the screw thread swage the curled portion with rather low driving torque. At the last stage, the third portion is driven there following the second portion and the screw is seated on the workpiece. Then peripheral revolution of the screw thread can be closely engaged with the female thread because of substantially a cross sectional circular of the third portion so that the screw can be secured to the workpiece steadily. At this time the engagement between the screw thread and the female thread can be increased by the longer curled portion as well as the engagement of the flat portion with the workpiece. Therefore the screw can have sufficient holding torque. And besides in a loaded condition the axial load can be devided on the peripheral revolution of the female thread and a stripping torque of the female thread can be increased because of the engagement of the peripheral revolution of the screw thread with the female thread. That is why any damage of the female thread cannot be introduced if a little larger axial load is added after fastening operation.

For a consideration of what I believe to be nobel and inventive, attention is directed to the following disclosure while the invention itself is pointed out with greater paticularity in appended claim.

BRIEF DESCRIPTION OF THE DRAWING

The above features and objects of the present invention will become more appearent with reference to the following description taken in conjunction with the acompanying drawings wherein like reference numerals denote like elements and which:

FIG. 3 is a view partially in section, illustrating a screw driven into a workpiece at the beginning of driving operation;

FIG. 4 A,B are views partially in longitudinal section, illustrating a screw driven into a workpiece during swaging operation and in the loaded condition, respectively.

DETAILED DESCRIPTION OF THE INVENTION

Figure 1:
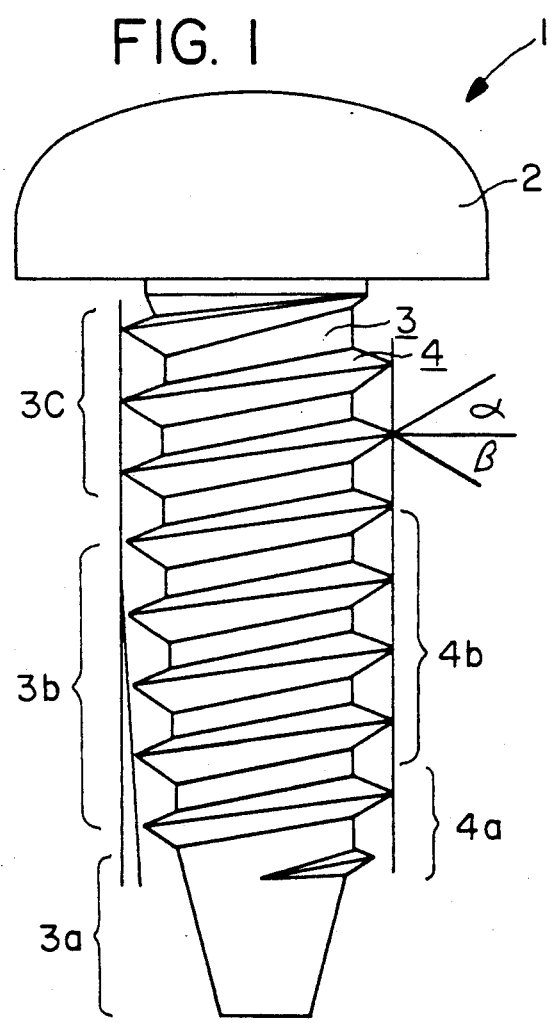
FIG. 1 is a fragmentary view of a thread forming fastener of the present invention.
Figure 2:
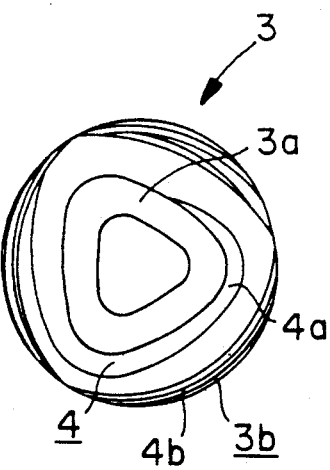
FIG. 2 is an end view of the fastener shown in FIG. 1.

Referring to the views of FIG. 1 and FIG. 2, the invention will first be described with reference to a thread forming fastener indicated generally at 1 having a driven head 2 with a slot recess or other driving means (not shown), a shank portion 3 merged with the driving head 2. The shank portion 3 consists of the first portion 3a which envolves a work entering end without a thread for entry to a pilot hole in a workpiece 5 almost as thick as a pitch of the screw thread 4 described hereinafter, the second portion 3b which envolves a thread formation 4b gradually and progressly forming the female thread 5a in the workpiece 5 and is merged with the first portion 3a, the third portion 3c which envolves a work holding portion in firm and peripheral engagement with the female thread 5a in the workpiece 5 and is merged with the second portion 3b. The first portion 3a, further is of a frustrum representative of equilateral polygonal pyramids, in which the configuration in cross section is of arcuate triangular shape having three arcuate lobes each of which serves to form the female thread 5a in a workpiece 5. Each lobe has a radius of curvature which is rather shorter than a pitch diameter of the screw thread 4 and half as long as a distance from the axis of the screw 1 to the crest of the lobe in a cross sectional configuration. The adjacent lobes of the three lobes merge smoothly and continuously with the intervening broad arcuate sides, each having a radius of curvature which is longer than half a pitch diameter of a cross sectional configuration of the first portion 3a. And the first portion 3a is formed so that the distance from the crest of the lobes to the axis of the screw and radius of each broad arcuate side are gradually and progressly increased toward the direction to spiral the second portion 3b. The second portion 3b has a single screw thread 4 merging at the joint point between the first portion 3a and the second portion 3b and extruding toward the driving head 2, incomplete revolutions 4a of which are formed over a part of the first portion 3a and have crest heights increased gradually and progressly.

The second portion 3b is of arcuate triangular shape in cross section following that of the first portion 3a, in which it is gradually and progressly changed and converted to substantially a circular shape toward the third portion 3c. That is, the distance from the axis of the screw 1 to the top of the arcuate lobes is substantially constant in the second portion 3b in which radii of curvature of the lobes are gradually increased toward the driving head 2 and radii of curvature of the lobes are gradually decreased toward the same direction. The second portion 3b, moreover has a single spiral thread 4 merging smoothly and continuously with the screw thread 4 on the first portion 3a. The screw thread 4 over the second portion 3b in cross section is gradually changed and converted from an arcuate triangular shape to a substantial circular shape and served as a thread formation 4b in which the lobes swage and enlarge the female thread 5a formed by the incomplete revolution 4a of the screw thread 4 around the joint portion to a complete female thread 5a, wherein an engagement of the screw thread 4 with the female thread 5a is increased gradually and progressly.

A third portion 3c which is of a substantially circular shape. Over the third portion 3c near the head 2, a screw thread 4 following the screw thread 4 on the second portion 3b is formed which is of a substantially circular shape in cross section. The third portion 3c, further may have serated portions (Not shown) in a flat portion between two adjacent screw threads at a length of one pitch. It can help the screw 1 with increasing a holding torque because of sufficient friction between the serated portion and the workpiece 5 when it is seated.

The screw thread 4 formed over the first portion 3a, the second portion 3b and the third portion 3c is of a symmetric triangular shape in longitudinal section having a crest angle of a larger leading flank angle α and a smaller following flank angle β. This configuration gives the screw 1 a larger sliding friction between the leading flank and the mating thread toward a direction that it is driven during the driving operation than that between the following flank and the mating thread toward a direction that it is loosed and causes it to be driven with low driving torque and to be prevented from rotating in a direction that it is loosed.

When a driver bit is engaged with the recess formed in a driving head 2 of the above screw 1 and a driving torque is given to the screw 1, the first portion 3a of a triangular polygonal pyramid of the screw 1 can go into a rather larger pilot hole in a workpiece 5. At this time, the screw 1 can go there without fail because of no screw thread 4 on the first portion 3a even if the pilot hole is rather smaller. At next stage, the screw 1 starts to be rotated in a certain torque and is axially forced toward the workpiece 5, the triangular pyramid can accordingly enlarge the hole and curl a portion around the pilot hole of the workpiece 5 without wearing out any thread formation on it as FIG. 3 shows. The curled portion 5b can have enough long a dimension to be swaged by the screw thread 4 because the pilot hole is punched or pierced as small as possible in the workpiece 5, wherein an incomplete thread 4a in the first portion 3a starts swaging the curled portion 5b and form a female thread 5a therein. The enlarged hole surrounded by the curled wall is formed as approximately a triangular shape and this can help the screw thread 4 to wedge in the wall and to start swaging the female thread 5a right now. Besides the first portion 3a is of approximately a triangular shape in cross section each lobe of which is engaged with the curled portion 5b. It can reduce the engagement of the screw thread 4 with the curled portion 5b and can provide with a disengagement of the screw thread 4 with the female thread 5a so that the screw 1 can begin swaging the thread 5a in the curled portion 5b with low driving torque.

At next stage a screw thread formation 4b on the second portion 3b is driven into the hole surrounded by the curled potion 5b, each lobe of which swages and enlarge the female thread 5a formed by the incomplete screw thread 4a because of lobes enlarged from triangular shapes to round shapes. Therefore the engagement of the lobes with the female thread 5a can be gradually increased and the screw thread can be mated with a complete female thread 5a so that any surged torque cannot be given during operation.

At the last stage, the third portion 3c is driven there following the second portion 3b and the screw 1 is seated on the workpiece 5. Then peripheral revolution of the screw thread 4 can be closely engaged with the female thread 5a because of substantially a cross sectional circular shape of the third portion 3c so that the screw 1 can be secured to the workpiece 5 steadily. Besides the axial load is added to the female thread 5a by way of the screw thread 4 until completing fastening operation. Therefore a sliding torque between the leading flank and the female thread is rather larger as FIG. 4A shows because a leading flank angle α is larger than a following flank angle β. This can help the screw 1 to rotate in a direction that it is driven and can reduce the driving torque during fastening operation. And besides during fastening operation the axial load can be devided on the peripheral revolution of the female thread 5a and a stripping torque of the female thread 5a can be increased because of the engagement of the peripheral revolution of the screw thread 4 with the female thread 5a. That is why any damage of the female thread 5a in a thin board cannot be introduced if a little larger stripping torque is added.

The thread forming fastener 1 has a certain holding torque after fastening operation while the screw thread 4 creates a certain stripping load of the female thread 5a. This stripping load can be also devided on the peripheral revolution of the female thread 5a so that it can provide with a larger stripping load. Furthermore, if the screw 1 is rotated with a certain torque in a direction that it is loosed, a sliding friction between the following flank and the female thread 5a created from the torque can be decreased as FIG. 4B shows and causes it to be prevented from rotating in a direction that it is loosed because a following flank angle β is rather small. And also it can accordingly increase a holding torque of the screws 1 with the increased engagement between the thread 4 and the female thread 5a in the workpiece 5.

I claim:

1. In a thread forming fastener comprising a driving head with a recess to be engaged with a driving tool and a shank portion, wherein the shank portion consists of a first portion of a tapered end portion which is of equilaterally polygonal shape in cross section having lobes wherein a distance from a screw axis to a crest of each lobe continuously increases toward the driving head, a second portion merged with the said first portion wherein a distance from the screw axis to a crest of each lobe of said second portion is constant and a cross sectional shape of said second portion continuously changes towards the driving head until said second portion is substantially circular in cross section, a third portion which is of a substantially circular shape in cross section merged with the second portion, and a continuous screw thread over the second portion and the third portion, the screw thread over the second portion and the third portion starts at a joint portion between the first portion and the second portion and spirals toward the head and is formed having a leading flank with a larger flank angle and a following flank with a smaller flank angle.

* * * * *